(12) United States Patent
Loeken et al.

(10) Patent No.: US 11,662,201 B2
(45) Date of Patent: May 30, 2023

(54) CALIBRATION APPARATUS FOR A ROTATIONAL ANGLE MEASURING SYSTEM

(71) Applicant: FRABA B.V., Heerlen (NL)

(72) Inventors: Michael Loeken, Juelich (DE); Michael Fink, Herzogenrath (DE)

(73) Assignee: FRABA B.V., SG Heerlen (NL)

( * ) Notice: Subject to any disclaimer, the term of this patent is extended or adjusted under 35 U.S.C. 154(b) by 96 days.

(21) Appl. No.: 17/439,408

(22) PCT Filed: Mar. 19, 2019

(86) PCT No.: PCT/EP2019/056855
§ 371 (c)(1),
(2) Date: Sep. 15, 2021

(87) PCT Pub. No.: WO2020/187403
PCT Pub. Date: Sep. 24, 2020

(65) Prior Publication Data
US 2022/0146255 A1 May 12, 2022

(51) Int. Cl.
*G01B 11/26* (2006.01)
*G01B 7/30* (2006.01)

(52) U.S. Cl.
CPC ............ *G01B 11/26* (2013.01); *G01B 7/30* (2013.01)

(58) Field of Classification Search
CPC ........ G01B 11/26; G01B 7/30; G01D 11/245; G01D 18/001; G01D 18/00
See application file for complete search history.

(56) References Cited

U.S. PATENT DOCUMENTS

| 4,858,393 A | 8/1989 | Yamada |
| 2008/0092385 A1 | 4/2008 | Susa et al. |
| 2008/0120850 A1 | 5/2008 | Brandl |
| 2014/0008089 A1 | 1/2014 | Yeoh et al. |

(Continued)

FOREIGN PATENT DOCUMENTS

| CN | 205333045 U | * | 6/2016 |
| CN | 205333045 U | | 6/2016 |
| DE | 10 2012 211 907 A1 | | 1/2014 |

(Continued)

*Primary Examiner* — Tarifur R Chowdhury
*Assistant Examiner* — Huy Phillip Pham
(74) *Attorney, Agent, or Firm* — Norman B. Thot (57) ABSTRACT

A calibration apparatus for a rotational angle measuring system includes a measuring system shaft and a measuring system housing. The calibration apparatus includes a shaft holding device which, in a calibration position, rotates about an axis of rotation and is co-rotatably connected to the measuring system shaft, and, in a load position, is decoupled from the measuring system shaft, a rotationally static housing holding device which, in the calibration position, is co-rotatably connected to the measuring system housing, and, in the load position, is decoupled from the measuring system housing, and a drive motor which drives the shaft holding device. In the calibration position, the shaft holding device has clamping jaws which are pressable onto the radial outer side of the measuring system shaft, and/or, the rotationally static housing holding apparatus has movable pistons which are pressable onto the radial outer side of the measuring system housing.

12 Claims, 3 Drawing Sheets

(56) References Cited

U.S. PATENT DOCUMENTS

2015/0054669 A1    2/2015   Okuyama

FOREIGN PATENT DOCUMENTS

| | | | | |
|---|---|---|---|---|
| EP | 0 281 286 A1 | 9/1988 | | |
| EP | 1 927 823 A2 | 6/2008 | | |
| JP | 2006-207528 A | 8/2006 | | |
| JP | 2011-110671 A | 6/2011 | | |
| JP | 2013-3053 A | 1/2013 | | |
| JP | 3199133 U | 8/2015 | | |
| JP | 2017146304 A | * | 8/2017 | ........... B23B 31/102 |
| WO | WO-2012108021 A1 | * | 8/2012 | ............. G01B 11/26 |

* cited by examiner

CALIBRATION APPARATUS FOR A ROTATIONAL ANGLE MEASURING SYSTEM

CROSS REFERENCE TO PRIOR APPLICATIONS

This application is a U.S. National Phase application under 35 U.S.C. § 371 of International Application No. PCT/EP2019/056855, filed on Mar. 19, 2019. The International Application was published in German on Sep. 24, 2020 as WO 2020/187403 A1 under PCT Article 21(2).

FIELD

The present invention relates to a calibration apparatus for a rotational angle measuring system comprising a shaft holding device which is rotatable about an axis of rotation which, in a calibration position of the calibration apparatus, can be non-rotatably connected to a measuring system shaft of the angle measuring system and which, in a loading position of the calibration apparatus, can be disconnected from the measuring system shaft, a rotationally fixed housing holding device which can be connected in a rotationally fixed manner to a measurement system housing of the angle measurement system in the calibration position and which can be disconnected from the measuring system housing in the loading position, and a drive motor for driving the shaft holding device.

BACKGROUND

It is often important to know a current angle of rotation or a current rotational position of a rotatable shaft of a machine for a precise operation thereof. Such position information plays an important role, for example, in the automation of systems, and specifically for controlling technical, mostly high-precision processes. Rotational angle measuring systems are always required for position detection, for example, for controlling a machine tool, a robot arm, or similar applications. Such rotational angle measuring systems are also necessary with electric motors for speed or position control, in particular in order to determine the rotational position of the rotor for an efficient coil control. The rotational angle measuring systems used may have different dimensions and geometries depending on the field of application, in particular with respect to the measuring system shaft.

A reliable and exact calibration of the rotational angle measuring system is necessary in order to obtain a high measuring accuracy with the rotational angle measuring system. A calibration apparatus for a rotational angle measuring system is described, for example, in CN 205333045 U. The calibration apparatus there described comprises a shaft holding device with a substantially pot-shaped shaft receptacle. A measuring system shaft of the rotational angle measuring system to be calibrated is inserted into the pot-shaped shaft holding device so that the shaft holding device radially surrounds the measuring system shaft. In a calibration position of the calibration device, the measuring system shaft is connected in a rotationally fixed manner to the shaft holding device via a locking screw, the end of which is pressed against a radial outer side of the measuring system shaft. The shaft holding device may be driven by a drive motor of a high-precision rotary table via a drive shaft. In the calibration position of the calibration apparatus, a measuring system housing of the rotational angle measuring system is connected in a rotationally fixed manner to a stationary housing holding device so as to prevent the measuring system housing from rotating with the measuring system shaft during the calibration process.

A rotationally fixed connection between the measuring system shaft and the shaft holding device and between the measuring system housing and the housing holding device must be secured during the entire calibration process to provide a reliable and precise calibration of the rotational angle measuring system. The locking screw of the calibration apparatus described in CN 205333045 U must therefore be tightened with a relatively high torque so as to obtain a high contact force between the locking screw and the measuring system shaft and to thus create a reliable rotationally fixed connection between the shaft holding device and the measuring system shaft. However, since this contact force only acts on a relatively small surface of the measuring system shaft, a high mechanical load is thereby generated at points on the measuring system shaft, which may result in local deformation and thus in structural damage to the measuring system shaft. Due to the one-sided radial load on the measuring system shaft caused by the locking screw, damage to the rotational angle measuring system may also be caused by a displacement and/or a tilting of the measuring system shaft in the measuring system housing.

Because of the design of its holding device, the calibration apparatus described in CN 205333045 U is also only designed for the calibration of rotational angle measuring systems having defined dimensions, in particular a defined shaft geometry. The described shaft holding device is basically suitable only for rotational angle measuring systems with a shaft diameter smaller than the opening diameter of the pot-shaped shaft receptacle. Rotational angle measuring systems having significantly smaller shaft diameters than the opening diameter of the shaft receptacle can moreover only be clamped reliably and without tolerances in the disclosed shaft holding device with the use of corresponding separate adapter elements.

SUMMARY

An aspect of the present invention is to provide a calibration apparatus for a rotational angle measuring system which provides a reliable and damage-free calibration of rotational angle measuring systems of different dimensions.

In an embodiment, the present invention provides a calibration apparatus for a rotational angle measuring system. The rotation angle measuring system includes a measuring system shaft which comprises a radial outer side, and a measuring system housing which comprises a radial outer side. The calibration apparatus includes a shaft holding device which, in a calibration position of the calibration apparatus, is configured to rotate about an axis of rotation and to be co-rotatably connected to the measuring system shaft of the rotational angle measuring system, and, in a load position of the calibration apparatus, is configured to be decoupled from the measuring system shaft of the rotational angle measuring system, a rotationally static housing holding device which, in the calibration position, is configured to be co-rotatably connected to the measuring system housing of the rotational angle measuring system, and in the load position, is configured to be decoupled from the measuring system housing of the rotational angle measuring system, and a drive motor which is configured to drive the shaft holding device. The shaft holding device comprises at least two clamping jaws which are configured to be pressed onto the radial outer side of the measuring system shaft of the rotational angle measuring system in the calibration position, the at least two clamping jaws being arranged concentrically with respect to the axis of rotation and being configured to be radially moved together, and/or, the rotationally static housing holding apparatus comprises at least two radially movable pistons which are configured to be pressed onto the radial outer side of the measuring system housing of the rotational angle measuring system in the calibration position.

BRIEF DESCRIPTION OF THE DRAWINGS

The present invention is described in greater detail below on the basis of embodiments and of the drawings in which.

DETAILED DESCRIPTION

The present invention provides that the shaft holding device of the calibration apparatus comprises at least two clamping jaws which are adapted to be pressed against a radial outer side of the measuring system shaft in the calibration position, wherein the at least two clamping jaws are arranged concentrically with respect to the axis of rotation and can be moved radially together, and/or the housing holding device of the calibration device comprises at least two radially movable pistons which, in the calibration position, can be pressed against a radial outer side of the measuring system housing.

The clamping jaws are concentric (i.e., at the same radial distance) with the axis of rotation of the shaft holding device and can be moved radially together so that all clamping jaws are always arranged concentrically with respect to the axis of rotation irrespective of their current radial position. The measuring system shaft is therefore reliably aligned concentrically with respect to the axis of rotation of the shaft holding device by the shaft holding device of the present invention so that the measuring system shaft is driven exactly around its central axis during calibration. The measuring system shaft is thereby reliably prevented from running out-of-true during calibration, which may result in erroneous calibration and/or damage to the rotational angle measuring system.

The at least two clamping jaws further provide a relatively large contact surface with the measuring system shaft. Only a relatively small contact force between the clamping jaws and the measuring system shaft is therefore required for a reliable rotationally fixed connection between the shaft holding device and the measuring system shaft. The mechanical load generated by the shaft holding device on the measuring system shaft is therefore relatively low.

The clamping jaws may be arranged, for example, in a so-called chuck (which is also referred to as a drill chuck or a lathe chuck) wherein, generally by turning a clamping ring, the clamping jaws may be moved axially together and be pressed uniformly against the measuring system shaft. The contact force between the clamping jaws and the measuring system shaft can be controlled in a simple and precise manner by turning the clamping ring. The clamping jaws can, for example, each be at the same distance from each other in the circumferential direction. The radial forces generated by the shaft holding device and acting on the measuring system shaft thereby substantially cancel each other out in total, thereby reliably preventing a displacement and/or a tilting of the measuring system shaft in the measuring system housing.

The large contact area between the clamping jaws and the measuring system shaft, the uniform distribution of the clamping jaws along the circumference of the measuring system shaft, and the accurate control of the contact force provide a reliable and damage-free rotationally fixed connection between the shaft holding device and the measuring system shaft. Due to the radially movable clamping jaws, the shaft holding device may also be easily adapted to different shaft geometries, in particular to different shaft diameters.

The at least two pistons of the housing holding device can, for example, each be radially movably arranged in a stationary piston unit. The piston unit may, for example, be fastened on the outside of a calibration apparatus housing. The piston units and thus also the pistons may be arranged on a radial outer side of the measuring system housing of the rotational angle measuring system. The at least two pistons are radially movable with respect to the measuring system housing, wherein, in the calibration position, each individual piston may be pressed against the radial outer side of the typically cylindrical measuring system housing in order to provide a reliable rotationally fixed connection between the housing holding device and the measuring system housing. The measuring system housing should here be understood as any body delimiting the rotational angle measuring system to the outside, which body is in a rotationally fixed connection with a sensor module of the rotational angle measuring system. The measuring system housing should therefore in particular also be understood as a flange element of the rotational angle measuring system. Due to the housing holding device of the present invention, a co-rotation of the measuring system housing and thus in particular a co-rotation of a measuring system sensor module with the measuring system shaft, which could result in a faulty calibration, is reliably prevented during the calibration process.

The piston units comprising the at least two pistons can, for example, be uniformly positioned along the outside of the measuring system housing. The at least two pistons can, for example, also be movable independently of each other. The pistons may be pressed against the radial outer side of the measuring system housing, in particular also in the case of asymmetrical measuring system housings, so that the radial forces acting on the measuring system housing substantially cancel each other out in total. A displacement and/or a tilting of the measuring system housing with respect to the measuring system shaft, which may result in a faulty calibration and/or a significant damage to the rotational angle measuring system, may thereby be reliably prevented. The housing holding device of the present invention having the radially movable pistons may here be variably adapted to different geometries of the measuring system housing.

The calibration apparatus of the present invention for a rotational angle measuring system therefore allows for a reliable and accurate calibration of rotational angle measuring systems having different shaft geometries, wherein damage to the rotational angle measuring system can be reliably avoided.

In an embodiment of the present invention, a clamping jaw actuator can, for example, be provided which provides a substantially stepless radial movement of the clamping jaws. The steplessly movable clamping jaws provide a precise control of the contact force between the clamping jaws and the measuring system shaft, whereby structural damage to the measuring shaft can be prevented in a particularly reliable manner. The clamping jaw actuator typically drives the clamping ring of a chuck to generate a precise and stepless radial movement of the clamping jaws. The clamping jaw actuator may be designed as a manual clamping jaw actuator which provides for a manual (generally a purely manual) actuation of the clamping jaws by an operator of the calibration apparatus. The clamping jaw actuator may alternatively also be configured as an electrically, a hydraulically, or a pneumatically driven clamping jaw actuator that provides for an electronic control of the clamping jaw movement, for example, by an electronic control unit of the calibration apparatus.

A coupling module via which the clamping jaw actuator may selectively be coupled mechanically with the clamping jaws or be decoupled mechanically from the clamping jaws can, for example, be provided. During the loading/unloading of the calibration apparatus (i.e., for the insertion the rotational angle measuring system in the calibration apparatus and for the removal of the rotational angle measuring system from the calibration apparatus), the clamping jaw actuator is coupled mechanically with the clamping jaws so as to provide the pressing of the clamping jaws against the measuring system shaft after loading or to provide the release of the clamping jaws from the measuring system shaft prior to unloading. During the actual calibration process, the clamping jaws are decoupled from the clamping jaws actuator so as to avoid an unintentional actuation of the clamping jaws, in particular an unintentional release of the clamping jaws from the measuring system shaft, during the calibration process, and so as to avoid a negative effect of the coupling module on the calibration process. This provides for a particularly reliable and damage-free calibration of the rotational angle measuring system.

In an advantageous embodiment of the present invention, the clamping jaw actuator can, for example, comprise an adjusting wheel for the manual actuation of the clamping jaws. The adjusting wheel is arranged to be accessible to an operator of the calibration apparatus (for example, on an outer side of a calibration apparatus housing) and provides a simple and precise manual actuation of the clamping jaws by the operator.

The shaft holding device advantageously comprises at least three clamping jaws. The at least three clamping jaws can, for example, be arranged so that they can be positioned in a manner distributed uniformly along the circumference of the measuring system shaft, at least in the calibration position of the calibration apparatus. The at least three clamping jaws provide a reliable centering of the measuring system shaft in the shaft holding device and thus provide a concentric positioning of the measuring system shaft with respect of the axis of rotation of the shaft holding device. The at least three clamping jaw (for example, at least six clamping jaws) also provide a relatively large contact area with the measuring system shaft so that the mechanical stress on the measuring system shaft generated by the shaft holding device of the calibration apparatus is particularly low. The at least three clamping jaws further provide for a reliable clamping of shafts having a non-round shaft cross section, i.e., a shaft cross section with at least one flattening along its circumference. This provides a reliable and at the same time particularly damage-free calibration apparatus, wherein the shaft holding device can be adapted to different shaft geometries in a particularly variable manner.

In an embodiment of the present invention, an anti-slip coating can, for example, be provided on a radial inner side of at least one clamping jaw. The anti-slip coating has a relatively high friction coefficient and is typically made of a plastic material, for example, an epoxy resin, polyurethane, or a natural rubber. The anti-slip coating prevents (in particular also with shafts having a round shaft cross section) a slipping of the shaft in the shaft holding device. The anti-slip coating also reduces the radial pressing force required for a reliable rotationally fixed connection. This provides a particularly reliable and damage-free calibration apparatus.

The at least two pistons can, for example, each be pneumatically movable. Such piston units are economical and allow for a precise and reliable actuation of the pistons, wherein the radial pressing force generated by the pistons can be controlled in a simple manner. In an embodiment of the present invention, a (for example, electronic) control unit is provided via which both the drive motor and the movement of the clamping jaws and/or the pistons can be controlled. The control unit is here typically configured so that the housing holding device and/or the shaft holding device is closed automatically before the shaft holding device is driven by the drive motor during the calibration process. It is thereby provided (independently of the operator of the calibration apparatus) that the measuring system housing cannot rotate with the measuring system shaft during a calibration of the rotational angle measuring system. This reduces the probability of operating errors and thus provides a reliable calibration apparatus.

In an embodiment of the present invention, the coupling module can, for example, be controlled via the control unit. The control unit is here typically configured so that the clamping jaws are mechanically decoupled from the clamping jaw drive via the coupling module before the shaft holding device is driven by the drive motor during the calibration process. The probability of operating errors is thereby further reduced and a particularly reliable and simple operable calibration apparatus is thus provided.

The shaft holding device of the calibration apparatus is advantageously mechanically coupled to the drive motor via a drive shaft. The drive shaft is typically non-rotatably connected to the shaft holding device at a first axial end and is non-rotatably connected to a rotor of the drive motor at an opposite second axial end. The drive shaft provides for a simple and reliable mechanical coupling of the shaft holding device to the drive motor.

In an embodiment of the present invention, a reference sensor module is provided via which a rotational angle of the drive shaft can be detected. The reference sensor module can, for example, have a relative high resolution, for example, a high-resolution optical or magnetic sensor module. The reference sensor module provides for a simple and accurate detection of the current drive shaft rotational angle and thus of the current rotational angle of the shaft holding device which is non-rotatable connected with the measuring system shaft. This provides an economical and precise calibration apparatus.

Rotational angle measuring systems may be designed with differently configured connectors, i.e., the connector of the rotational angle measuring system may have different allocations of the pins/sockets. An advantageous embodiment of the present invention therefore provides a selection circuit via which the calibration apparatus can be connected electrically and/or in a signaling manner with the rotational angle measuring system, in particular with a sensor module of the rotational angle measuring system. Such selection circuits are also referred to as multiplexers and provide for a selective switching of different inputs onto an output or vice versa. The selection circuit provides a simple electric/signaling connection with differently configured connectors, without requiring different adapters for this purpose. This provides a calibration apparatus that can be adapted to different rotational angle measuring system designs in a simple manner.

An embodiment of a calibration device for a rotational angle measuring system is described below in detail under reference to the accompanying drawings.

Figure 1:
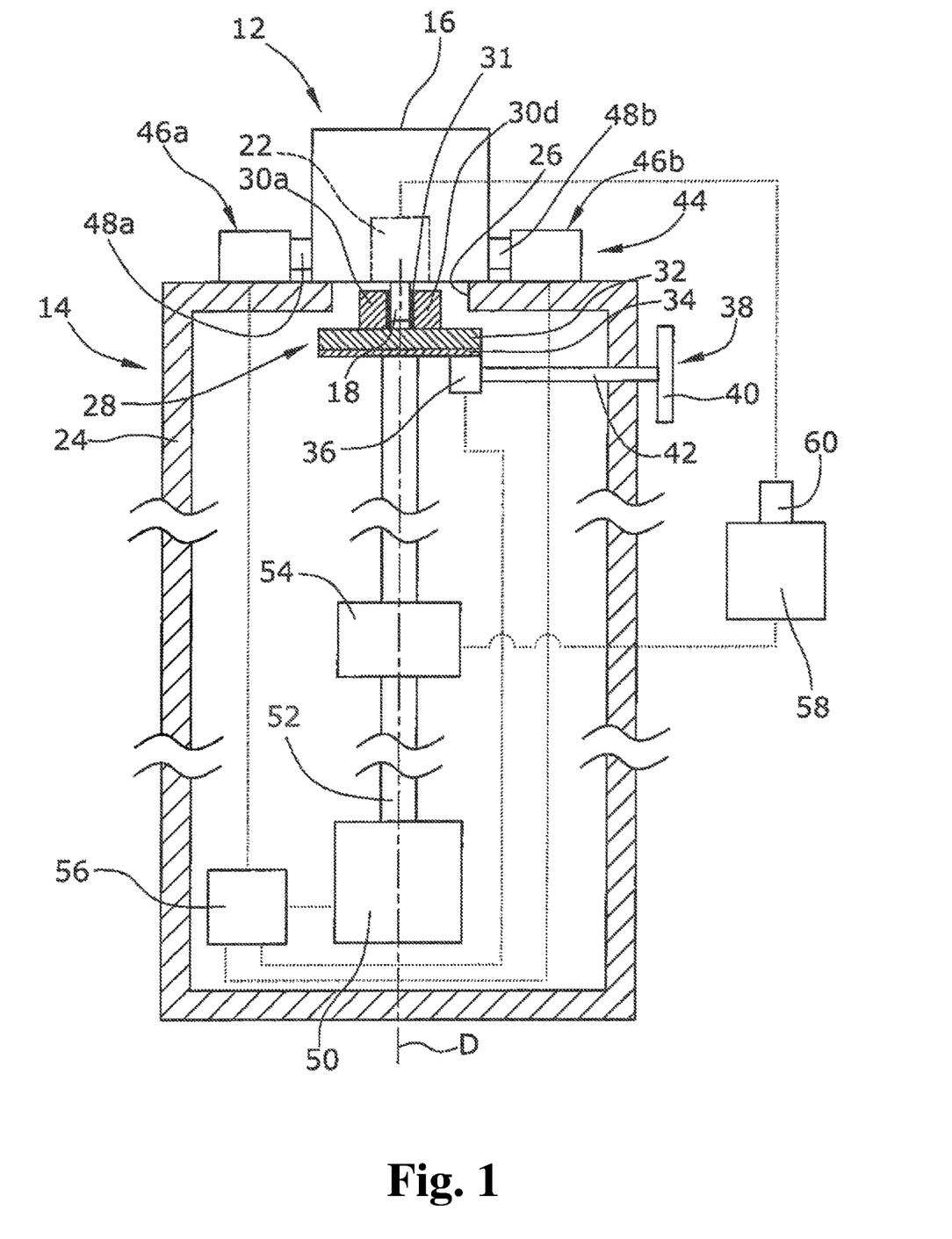
FIG. 1 schematically illustrates a partly sectional view of a calibration position of a calibration apparatus according to the present invention with an inserted rotational angle measuring system.
Figure 2:
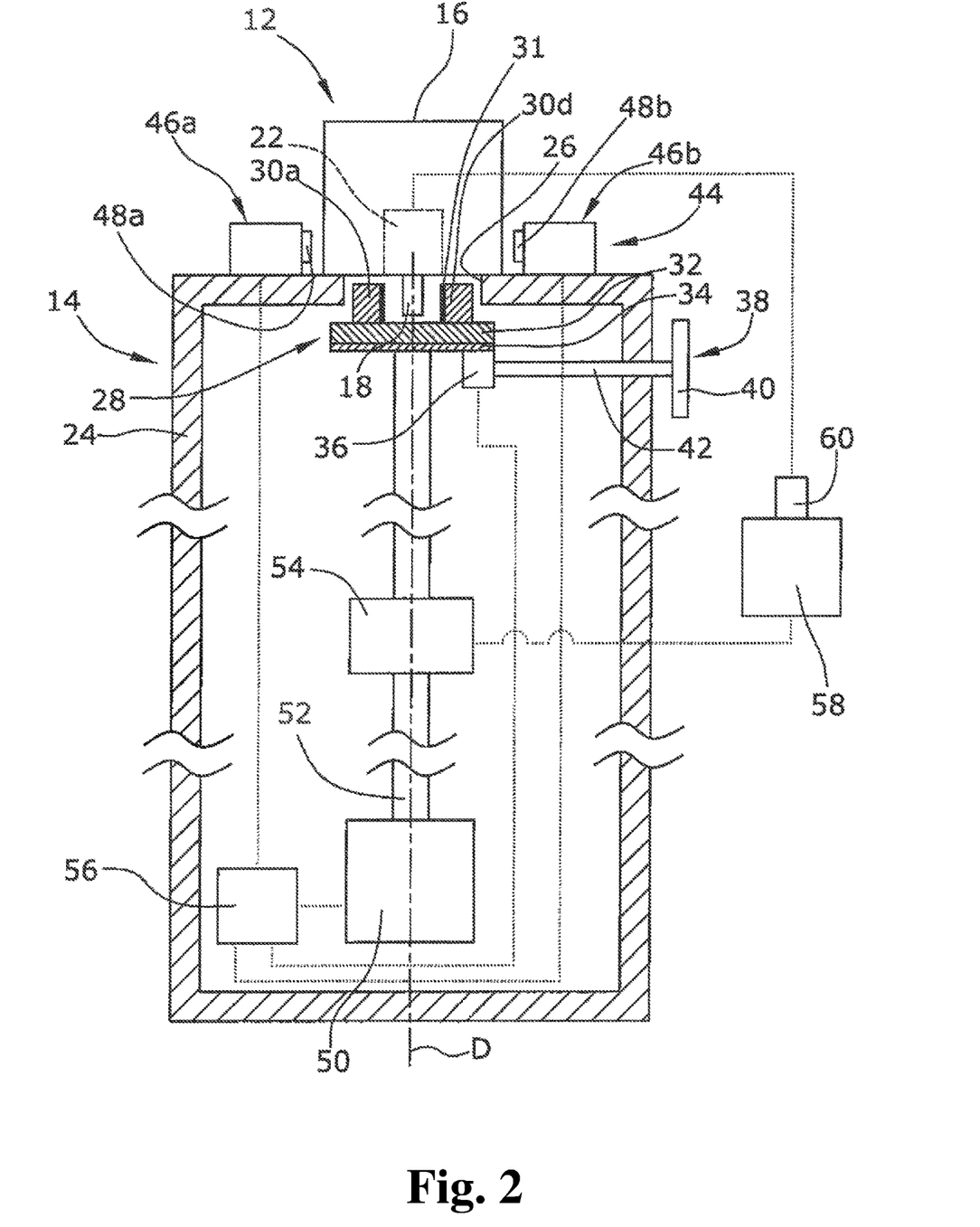
FIG. 2 shows a loading position of the calibration apparatus with the rotational angle measuring system of FIG. 1 inserted.

FIGS. 1 and 2 illustrate a calibration apparatus 14 for the calibration of a rotational angle measuring system 12. The rotational angle measuring system 12 to be calibrated is inserted into the calibration apparatus 14 for calibration. The rotational angle measuring system 12 comprises a substantially cylindrical measuring system housing 16 and a measuring system shaft 18 which is supported in the measuring system housing 16 for rotation relative thereto. The measuring system shaft 18 protrudes axially from the measuring system housing 16 at an axial lower side of the measuring system housing 16. The rotational angle measuring system 12 further comprises a measuring system sensor module 22 for detecting a rotational movement of the measurement shaft, the measuring system sensor module 22 being non-rotatably connected with the measuring system housing 16. The measuring system sensor module 22 can, for example, be a magnet-based sensor module with a Wiegand sensor (which is not illustrated in detail).

The calibration apparatus 14 comprises a calibration apparatus housing 24. The calibration apparatus housing 24 can, for example, have a circular housing opening 26 in an axial upper side, through which the measuring system shaft 18 of the rotational angle measuring system 12 which is inserted into the calibration apparatus 14 protrudes axially or into which the measuring system shaft 18 at least dips. The measuring system shaft 18 can, for example, be positioned in the center of the housing opening 26, at least in a calibration position of the calibration apparatus 14 illustrated in FIG. 1.

Figure 3:
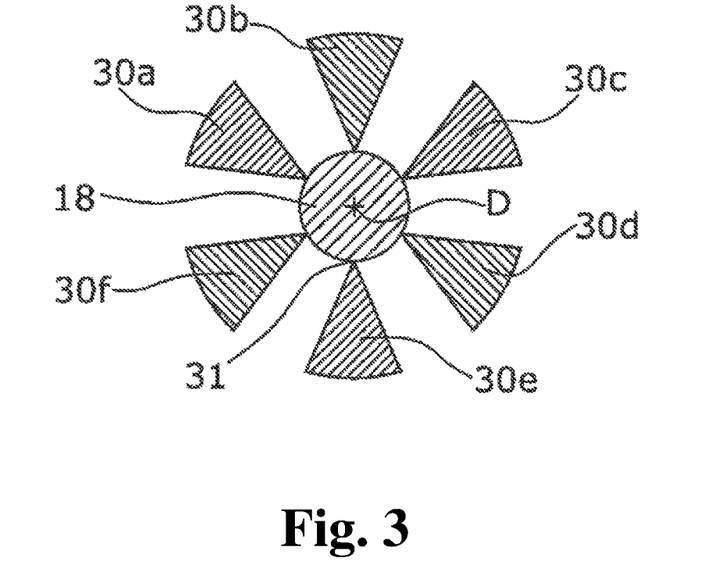
FIG. 3 shows a schematic cross section of clamping jaws of a shaft holding device of the calibration apparatus, as well as a measuring system shaft of the rotational angle measuring system in the calibration position.

The calibration apparatus 14 further comprises a shaft holding device 28 which is arranged in the calibration apparatus housing 24 and which is rotatable about an axis of rotation D. The shaft holding device 28 comprises six clamping jaws 30a-f arranged on a clamping jaw support 32 so as to be radially movable in the present embodiment. Each clamping jaw 30a-f has an anti-slip coating 31 on its radial inner side. The six clamping jaws 30a-f are arranged concentric with respect to the axis of rotation D and (at least in the calibration position) are positioned in a regularly distributed manner along the circumference of the measuring system shaft 18 of the rotational angle measuring system 12 inserted. Adjacent clamping jaws 30a-f are thus respectively arranged rotated by an angle of 60° with respect to each other relative to a center of the measuring system shaft 18. The clamping jaws 30a-f are radially movable so that, in the calibration position, the clamping jaws 30a-f are pressed against a radial outer side of the measuring system shaft 18 by the anti-slip coating 31 and, in a loading position illustrated in FIG. 2, are not in contact with a radial outer side of the measuring system shaft 18. In the calibration position, the shaft holding device 28 is thus non-rotatably connected with the measuring system shaft 18, wherein the measuring system shaft 18 is positioned concentrically with respect to the axis of rotation D. In the loading position, the shaft holding device 28 is mechanically decoupled from the measuring system shaft 18.

The shaft holding device 28 has a clamping ring 34 arranged movably relative to the clamping jaw support 32. The shaft holding device 28 is designed so that, by twisting the clamping ring 34 relative to the clamping jaw support 32, all clamping jaws 30a-30f can be moved radially at the same time and uniformly. In the present embodiment, the clamping jaw actuator 38 comprises an adjusting wheel 40 which his arranged outside the calibration apparatus housing 24, which is connected with the coupling module 36 via an adjusting wheel shaft 42. The coupling module 36 is here designed so that, in the coupled state, the adjusting wheel shaft 42 is mechanically coupled with the clamping ring 34, and thus with the clamping jaws 30a-f, so that the clamping jaws 30a-f are simultaneously and uniformly radially movable by rotation of the adjusting wheel 40. The coupling module 36 can, for example, comprise a gearing via which the clamping ring 34 can be coupled mechanically with the adjusting wheel shaft 42, if necessary.

The calibration apparatus 14 further comprises a rotationally fixed housing holding device 44 which is mounted outside the calibration apparatus housing 24 on the upper side of the calibration apparatus housing 24. The housing holding device 44 comprises two piston units 46a, b in the present embodiment. The piston units 46a, b are arranged so that they are positioned on opposite sides of the measuring system housing 16 of the inserted rotational angle measuring system 12. Each piston unit 46a, b comprises a piston 48a, b which is radially movable relative to the measuring system housing 16. The pistons 48a, b are each pneumatically movable in the present embodiment. In the calibration position, the pistons 48a, b are each pressed against a radial outer side of the measuring system housing 16. In the loading position, the pistons 48a, b are shifted radially outward relative to the calibration position so that the pistons 48a, b are not in physical contact with the measuring system housing 16. In the calibration position, the housing holding device 44 is thus non-rotatably connected with the measuring system housing 16, and is mechanically decoupled from the measuring system housing 16 in the loading position.

The calibration apparatus 14 further comprises a drive motor 50 which is arranged in the apparatus housing 24 and which is mechanically coupled with the shaft holding device 28 via a drive shaft 52. The drive motor 50 can, for example, be an electric motor. At a first axial end, the drive shaft 52 is non-rotatably connected with the shaft holding device 28 (and specifically with the clamping jaw support 32 of the shaft holding device 28) and, at a second, opposite axial end, is connected with a rotor of the drive motor 50 (which is not illustrated in detail). The shaft holding device 28 with the clamping jaws 30a-f is thus rotationally drivable by the drive motor 50.

A calibrated reference sensor module 54 is arranged at the drive shaft 52, via which a current rotational angle of the drive shaft 52 can be detected. The calibrated reference sensor module 54 is a high-resolution optical sensor module in the present embodiment.

The calibration apparatus 14 further comprises an electronic control unit 56 in the present embodiment. The control unit 56 is connected electrically or in a signaling manner with each of the drive motor 50, the piston units 46a, b of the housing holding device 44, as well as with the coupling unit 36, so that the drive motor 50, the movement of the pistons 48a, b, and the coupling state of the coupling unit 36 can be controlled by the control unit 56. The control unit 56 is configured so that, prior to controlling the drive motor 50, the piston units 46a, b are controlled to radially press the pistons 48a, b against the measuring system housing 16, and the coupling unit 36 is controlled to decouple the adjusting wheel drive 42 from the shaft holding device 28. It is hereby provided that, when the shaft holding device 28 is driven by the drive motor 50, the measuring system housing 16 is non-rotatably connected with the calibration apparatus housing 24 via the housing holding device 44, and the shaft holding device 28 is mechanically decoupled from the clamping jaw actuator 38 by the coupling unit 36.

In the present embodiment, the calibration apparatus 14 comprises a separate evaluation unit 58 which is arranged outside the calibration apparatus housing 24. The evaluation unit 58 and the control unit 56 may also alternatively be formed by a single electronic component, for example, arranged in the calibration apparatus housing. Via a selection circuit 60, the evaluation unit 58 is connected electrically and/or in a signaling manner with the measuring system sensor module 22 to be calibrated. A simple adaptation of the calibration apparatus 14 to differently designed connectors of the rotational angle measuring system 12 is here possible. The selection circuit 60 is designed as a separate unit, but may alternatively also be designed as a part of the evaluation unit 58 in the present embodiment of the present invention. The evaluation unit 58 is further connected electrically and/or in a signaling manner with the calibrated reference sensor module 54.

During the calibration process, the shaft holding device 28 and the housing holding device 44 are in the calibration position so that the measuring system housing 16 is non-rotatably connected with the calibration apparatus housing 24 via the housing holding device 44, and the measuring system shaft 18 is non-rotatably connected with the drive shaft 52 via the shaft holding device 28. During the calibration process, the clamping jaw drive 38 is also mechanically decoupled from the shaft holding device 28 via the coupling module 36.

For a calibration of the rotational angle measuring system 12, the measuring system shaft 18 is rotationally driven by the drive motor 50 of the calibration apparatus 14 via the drive shaft 52 and the shaft holding device 29. The rotational movement of the drive shaft 52 and thus also the rotational movement of the measuring system shaft 18, which is non-rotatably connected with the drive shaft 52 via the shaft holding device 28, is here detected by the evaluation unit 58 via the calibrated reference sensor module 54. The rotational angle measuring system 12 is calibrated by the evaluation unit 58 so that a measuring system sensor signal provided by the measuring system sensor module 22 corresponds to a reference sensor signal provided by the calibrated reference sensor module 54.

The present invention is not limited to embodiments described herein; reference should be had to the appended claims.

LIST OF REFERENCE NUMERALS

12 Rotational angle measuring system
14 Calibration apparatus
16 Measuring system housing
18 Measuring system shaft
22 Measuring system sensor module
24 Calibration apparatus housing
26 Housing opening
28 Shaft holding device
30a-f Clamping jaws
31 Anti-slip coating
32 Clamping jaw support
34 Clamping ring
36 Coupling module
38 Clamping jaw actuator
40 Adjusting wheel
42 Adjusting wheel shaft
44 Housing holding device
46a,b Piston units
48a,b Pistons
50 Drive motor
52 Drive shaft
54 Calibrated reference sensor module
56 Control unit
58 Evaluation unit
60 Selection circuit
D Axis of rotation

What is claimed is:

1. A calibration apparatus for a rotational angle measuring system, wherein the rotation angle measuring system comprises:
    a measuring system shaft which comprises a radial outer side; and
    a measuring system housing which comprises a radial outer side,
the calibration apparatus comprising:
    a shaft holding device which, in a calibration position of the calibration apparatus, is configured to rotate about an axis of rotation and to be co-rotatably connected to the measuring system shaft of the rotational angle measuring system, and, in a load position of the calibration apparatus, is configured to be decoupled from the measuring system shaft of the rotational angle measuring system;
    a rotationally static housing holding device which, in the calibration position, is configured to be co-rotatably connected to the measuring system housing of the rotational angle measuring system, and in the load position, is configured to be decoupled from the measuring system housing of the rotational angle measuring system; and
    a drive motor which is configured to drive the shaft holding device,
    wherein at least one of,
    the shaft holding device comprises at least two clamping jaws which are configured to be pressed onto the radial outer side of the measuring system shaft of the rotational angle measuring system in the calibration position, the at least two clamping jaws being arranged concentrically with respect to the axis of rotation and being configured to be radially moved together, and
    the rotationally static housing holding device comprises at least two radially movable pistons which are configured to be pressed onto the radial outer side of the measuring system housing of the rotational angle measuring system in the calibration position.

2. The calibration apparatus as recited in claim 1, further comprising:
    a control unit which is configured to control the drive motor and at least one of a movement of the at least two clamping jaws and a movement of the at least two radially movable pistons.

3. The calibration apparatus as recited in claim 2, wherein the clamping jaw actuator comprises an adjusting wheel which is configured to provide a manual actuation of the at least two clamping jaws.

4. The calibration apparatus as recited in claim 1, further comprising:
a clamping jaw actuator which is configured to provide a substantially stepless radial movement of the at least two clamping jaws.

5. The calibration apparatus as recited in claim 4, further comprising:
a coupling module which is configured to selectively mechanically couple the clamping jaw actuator with the at least two clamping jaws or to selectively mechanically decouple the clamping jaw actuator with the at least two clamping jaws.

6. The calibration apparatus as recited in claim 5, further comprising:
a control unit which is configured to control the drive motor and at least one of a movement of the at least two clamping jaws and a movement of the at least two radially movable pistons,
wherein,
the control unit is further configured to control the coupling module.

7. The calibration apparatus as recited in claim 1, wherein the shaft holding device comprises at least three of the at least two clamping jaws.

8. The calibration apparatus as recited in claim 1, wherein at least one of the at least two clamping jaws comprises an anti-slip coating on a radial inner side thereof.

9. The calibration apparatus as recited in claim 1, wherein the at least two radially movable pistons are further configured to each be pneumatically actuatable.

10. The calibration apparatus as recited in claim 1, further comprising:
a drive shaft which is configured to mechanically couple the shaft holding device with the drive motor.

11. The calibration apparatus as recited in claim 10, further comprising:
a reference sensor module which is configured to detect an angle of rotation of the drive shaft.

12. The calibration apparatus as recited in claim 1, further comprising:
a selection circuit which is configured to connect the calibration apparatus with the rotational angle measuring system at least one of electrically and in a signaling manner.

* * * * *